United States Patent [19]

Iida et al.

[11] 4,381,521
[45] Apr. 26, 1983

[54] OPTICAL FINDER SYSTEM FOR A VIDEO CAMERA

[75] Inventors: Yozo Iida, Komae; Soichi Nakamura, Kamakura, both of Japan

[73] Assignee: Nippon Kogaku K.K., Tokyo, Japan

[21] Appl. No.: 337,747

[22] Filed: Jan. 7, 1982

[30] Foreign Application Priority Data

Jan. 22, 1981 [JP] Japan .................................. 56-8386

[51] Int. Cl.³ ............................................. H04N 9/04
[52] U.S. Cl. ...................................... 358/55; 358/44; 358/224
[58] Field of Search ..................... 358/55, 43, 44, 224

[56] References Cited
U.S. PATENT DOCUMENTS 2,986,599  5/1961  Lindnor et al. ..................... 358/224
4,093,346  6/1978  Nishino et al. ....................... 358/44

Primary Examiner—Richard Murray
Attorney, Agent, or Firm—Michael N. Meller; Anthony H. Handal

[57] ABSTRACT

There is described an optical finder system for use with video cameras of the type having a tri-color separation color filter. Positioned in the finder optical path is an optical member onto which the image of an object to be picked up is projected and the optical member has an irregular pattern which is the same or similar to that of the color filter, whereby Moiré fringes similar to those produced by the object image in cooperation with the color filter are produced on the finder focussing or imaging surface.

5 Claims, 10 Drawing Figures

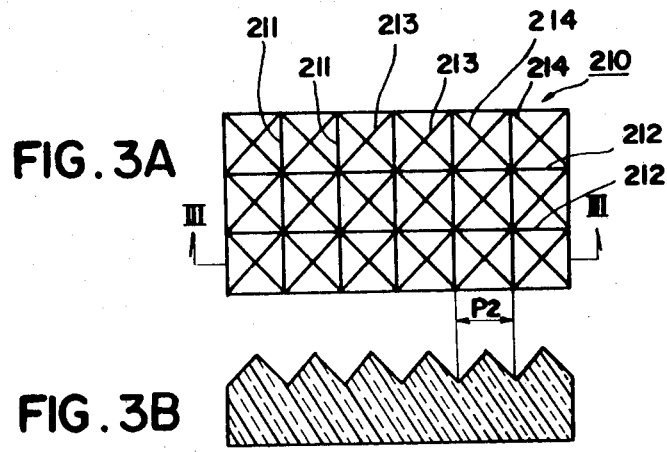
FIG. 3A
FIG. 3B
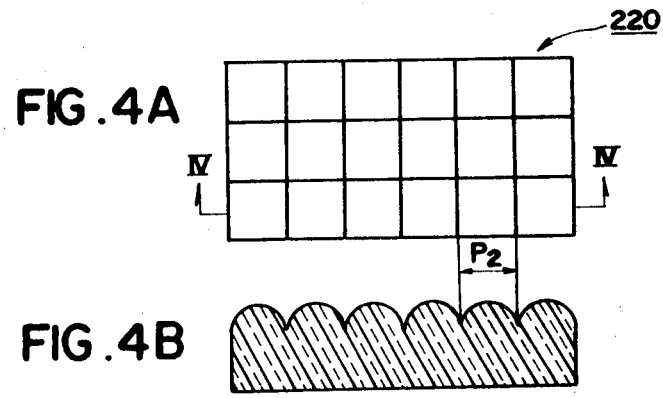
FIG. 4A
FIG. 4B
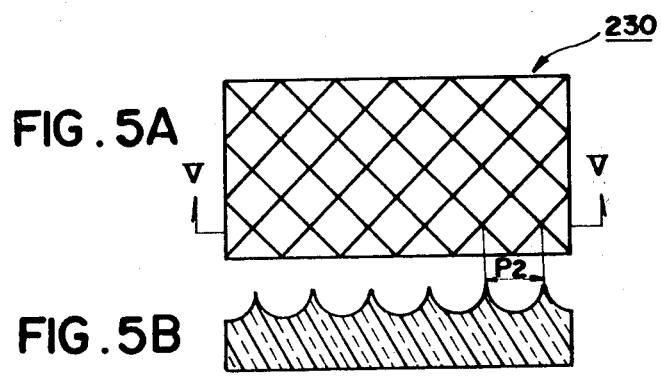
FIG. 5A
FIG. 5B to understand the present invention thereof with reference to the accompanying drawings which illustrate exemplary

OPTICAL FINDER SYSTEM FOR A VIDEO CAMERA

FIELD OF THE INVENTION

The present invention relates to video cameras and more particularly to an optical finder system for video cameras of the type having a tri-color separation color filter.

DESCRIPTION OF THE PRIOR ART

With a known type of video camera which is called as a single-tube or two-tube type, a tri-color separation color filter such as a so-called color stripe filter or a mosaic filter comprising a combination of two color stripe filters is arranged at the image pickup surface of a pickup device such as a pickup tube or a solid-state image scanner or sensor to produce the desired three primary color picture signals.

As a result, where an object to be picked up consists of fine stripes or has a cross stripes pattern, the picking up of such an object results in the generation of Moire fringes (interference fringes) on the picture and this makes the picture extremely unsightly. In the case of a video camera equipped with an electronic viewfinder employing a CRT, the operator can confirm the generation of the Moire fringes through the finder and thus the operator can take the necessary action to eliminate the Moire fringes. However, video cameras of the type having an optical viewfinder have a disadvantage that the operator cannot confirm the generation of Moire fringes and thus the operator cannot take any effective action allowing the recording of an unsightly picture without knowing it.

SUMMARY OF THE INVENTION

It is the primary object of the present invention to provide a video camera equipped with an improved optical finder system.

In accordance with the present invention there is thus provided a video camera including an optical finder system having an optical member disposed near a focussing or imaging surface to traverse the finder optical path and onto the surface of which is projected the image of an object to be picked up, and the optical member is formed with a special pattern which is substantially the same or similar to that of a tri-color separation color filter positioned at the image pickup surface of an image pickup device. The special pattern of the optical member is required only to have the similarities to the pattern of the color filter with respect to the pattern density and direction so that Moire fringes are simultaneously formed on the focussing surface of the finder while Moire fringers are formed on the image pickup surface by the image of the object in cooperation with the pattern of the color filter. In this case, the Moire fringes generated at the two places need not be identical with each other.

The invention will become more fully apparent from the following detailed description thereof taken in conjunction with the accompanying drawings.

BRIEF DESCRIPTION OF THE DRAWINGS

FIG. 3A is a partial enlarged plan view showing an exemplary pattern structure of the focussing screen shown in FIG. 1.

FIG. 3B is a sectional view looked in the direction of the arrow line III—III of FIG. 3A.

FIG. 4A is an enlarged plan view showing another example of the pattern structure of the focussing screen.

FIG. 4B is a sectional view looked in the direction of the arrow line IV—IV of FIG. 4A.

FIG. 5A is an enlarged plan view showing still another example of the pattern structure of the focussing screen.

FIG. 5B is a sectional view looked in the direction of the arrow line V—V of FIG. 5A.

DESCRIPTION OF THE PREFERRED EMBODIMENTS

Figure 1:
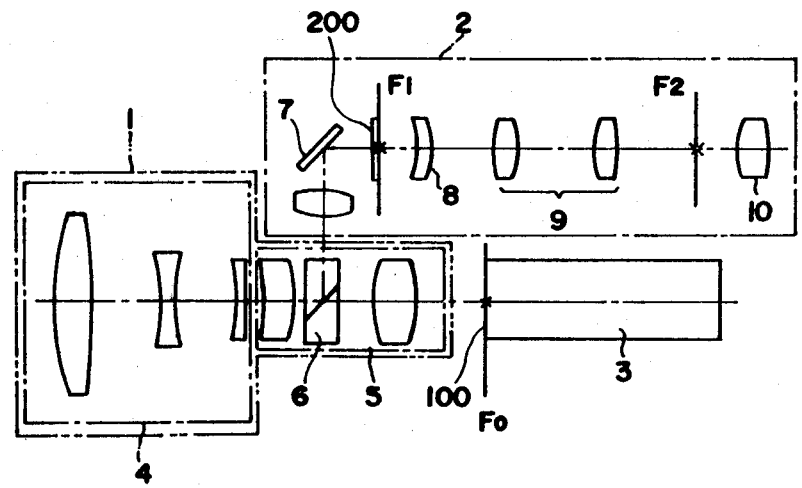
FIG. 1 is a diagram showing an optical arrangement of a video camera according to an embodiment of the invention.

The video camera shown in FIG. 1 comprises a pickup unit including a phototaking or imaging optical system 1, a finder optical system 2 and a pickup tube 3. The phototaking optical system 1 comprises a variable magnification lens system 4 and focussing lens system 5. A beam splitter 6 which is disposed in the optical path of the phototaking optical system 1 introduces a part of the image beam into the finder optical system 2. The finder optical system 2 comprises a reflecting mirror 7, a field lens 8, relay lenses 9 and an eyepiece 10, and the beam from the beam splitter 6 is passed to the eyepiece 10. The light from the object which was passed through the phototaking optical system 1 is focussed onto a focussing or imaging surface $F_0$ and it is also focussed onto each of primary and secondary focussing or imaging surfaces $F_1$ and $F_2$ in the finder optical system 2. A tri-color separation color filter 100 is disposed on the focussing surface $F_0$ and thus the focussing surface $F_0$ corresponds to the image pickup surface of the pickup tube 3. Disposed adjacent to the primary focussing surface $F_1$ is a light transmitting focussing screen 200 having formed on the surface thereof a predetermined regularly arranged three-dimensional pattern for the purpose of focussing detection and Moire fringe detection.

Figure 2A:
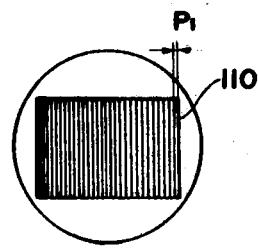
FIGS. 2A, 2B and 2C are plan views showing examples of a tri-color separation color filter having different patterns.
Figure 2B:
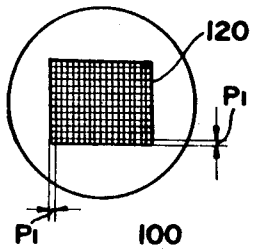
Figure 2C:
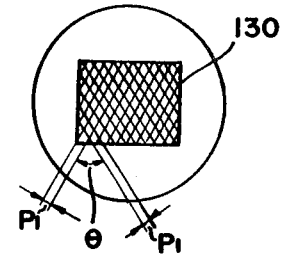

Usually, the color filter 100 on the focussing surface $F_0$ includes a fine stripe pattern such as shown in FIG. 2A or a fine mosaic pattern 120 or 130 such as shown in FIG. 2B or 2C. The mosaic pattern 120 is formed by combining a color stripe filter of vertical stripe elements and a color stripe filter of lateral stripe elements so that the vertical and lateral stripes cross each other at right angles, and the mosaic pattern 130 is formed by combining two color stripe filters in such a manner that their stripe elements cross each other at an angle $\theta$.

FIGS. 3A to 5B show some exemplary forms of the three-dimensional pattern formed on the focussing screen 200.

The three-dimensional pattern 210 shown in FIGS. 3A and 3B is formed by regularly arranging fine quadrangular pyramids, and the three-dimensional pattern 220 is formed by regularly arranging fine elements each having a square base and a top forming a part of a sphere. The three-dimensional pattern 230 shown in FIGS. 5A and 5B is formed by regularly arranging fine quadrangular pyramids having curved edges. As will be seen from these Figures, each of the three-dimensional patterns comprises a pattern of a plurality of stripes extended in different directions. For instance, the three-dimensional pattern 210 includes vertical stripes 211, lateral stripes 212 and oblique stripes 213 and 214. Assuming now that the color filter 100 of FIG. 1 has the pattern 110 of FIG. 2A, the three-dimensional pattern 210 or 220 including vertical stripe elements is selected for the pattern of the focussing screen 200. Where the color filter 100 has the pattern 130, the three-dimensional pattern 210 or 230 is selected for the focussing screen 200.

With the construction described above, when an object made up of fine vertical stripes or a mosaic pattern is picked up so that Moire fringes are produced on the image pickup surface of the pickup tube 3, Moire fringes are also produced on the focussing screen 200 formed with the previously-mentioned regularly arranged three-dimensional pattern and thus the operator can confirm the production of the Moire fringes through the optical finder. Of course, the focussing condition can be observed by means of the focussing screen 200. In order to produce on the focussing screen 200 Moire fringes which are identical in direction and pitch with the Moire fringes produced on the image pickup surface of the pickup tube 3, it is preferable that the stripes of the color filter 100 are identical in direction with those of the three-dimensional pattern and also the pitch $P_1$ of the color filter stripes is the same with the pitch $P_2$ of the stripes of the three-dimensional pattern (assuming that the object images on the focussing surfaces $F_0$ and $F_1$ have the same magnification). However, if the object is to simply confirm the presence of Moire fringes, the two patterns need not be identical in direction and pitch and it is sufficient that the patterns are approximately the same in these respects. While, in this embodiment, the focussing screen 200 is disposed near the primary focussing surface $F_1$ in the finder optical system 2, it may be disposed near the secondary focussing surface $F_2$. Further, while, in this embodiment, the three-dimensional pattern is formed on the focussing screen 200, it is possible to prepare a separate optical member having a pattern which is identical or almost the same with that of the tri-color separation color filter 100, attach it to the focussing screen 200 to be integral therewith and dispose them near the primary focussing surface $F_1$ or the secondary focussing surface $F_2$ in the finder optical system 2. Alternatively, the focussing screen 200 and the optical member may respectively be disposed on the primary and secondary focussing surfaces $F_1$ and $F_2$.

With other types of video cameras such as three-tube type, while no optical Moire fringes will be produced since no tri-color separation color filter is used, when an object made up of vertical stripes or a mosaic pattern is picked up so that the frequency of the luminance signal approaches the color subcarrier frequency of 3.58 MHz, the luminance signal is detected mistakenly for the chrominance signal and thus Moire fringes are produced. While the occurrence of Moire fringes due to such signal transmission factors is known, in accordance with the present invention Moire fringes will be produced in the finder system even in the case of Moire fringes other than those caused by the use of a tri-color separation color filter as mentioned previously and thus operator can confirm the Moire fringes.

What is claimed is:

1. In a video camera including a pickup device for converting a first optical image of an object formed on an image pickup surface by an imaging optical system into an electric signal, and an optical finder system whereby a second optical image substantially identical with said first optical image is formed on an imaging surface such that said second optical image on said imaging surface is observable through an eyepiece, said pickup device including color separating filter means disposed on said image pickup surface and having a fine stripe or mosaic pattern, the improvement comprising:

optical means disposed in close proximity to said imaging surface of said optical finder system across an optical axis in such a manner that said second optical image is projected onto a surface of said optical means, said optical means including a plurality of fine optical elements arranged in a pattern similar to said fine pattern of said filter means.

2. A video camera according to claim 1, wherein each of said optical elements is made of a light transmission material, and wherein said optical means is formed to transmit light.

3. A video camera according to claim 2, wherein each of said optical elements is in the form of a small prism thereby forming irregularities in the direction of said optical axis.

4. A video camera according to claim 1, wherein said plurality of optical elements are arranged with respect to said second optical image on said imaging surface in substantially the same direction with the direction of the stripes or at least one direction of the mosaic of said pattern of said filter means in the arrangement thereof with respect to said first optical image on said image pickup surface.

5. A video camera according to claim 1, wherein said plurality of optical elements comprise a group of pyramidal prisms each having a vertex projecting from the surface of said optical means, and wherein said group of prisms are arranged in such a manner that the direction of arrangement of said vertexes with respect to said second optical image on said imaging surface is substantially the same with the direction of the stripes or at least one direction of the mosaic of said pattern of said filter means in the arrangement thereof with respect to said first optical image on said image pickup surface.

* * * * *